(12) United States Patent
Makino et al.

(10) Patent No.: US 11,644,318 B2
(45) Date of Patent: *May 9, 2023

(54) NAVIGATION DATA PROCESSING SYSTEM, APPARATUS AND COMPUTER READABLE MEDIUM

(71) Applicant: MICWARE CO., LTD., Kobe (JP)

(72) Inventors: Hiroyuki Makino, Kobe (JP); Takuma Segawa, Kobe (JP); Yasuhito Kawase, Kobe (JP); Kenta Imaida, Kobe (JP)

(73) Assignee: MICWARE CO., LTD., Kobe (JP)

( * ) Notice: Subject to any disclaimer, the term of this patent is extended or adjusted under 35 U.S.C. 154(b) by 245 days.

This patent is subject to a terminal disclaimer.

(21) Appl. No.: 17/082,508

(22) Filed: Oct. 28, 2020

(65) Prior Publication Data

US 2021/0063171 A1 Mar. 4, 2021

Related U.S. Application Data

(63) Continuation of application No. 16/323,500, filed as application No. PCT/JP2017/029274 on Aug. 14, 2017, now Pat. No. 10,852,149.

(30) Foreign Application Priority Data

Aug. 19, 2016 (JP) .................................. 2016-161480

(51) Int. Cl.
*G01C 21/34* (2006.01)
*G06F 9/54* (2006.01)
(Continued)

(52) U.S. Cl.
CPC ............... *G01C 21/34* (2013.01); *G06F 9/54* (2013.01); *G08G 1/0969* (2013.01); *G06F 8/60* (2013.01)

(58) Field of Classification Search
CPC .. G01C 21/34; G06F 9/54; G06F 8/60; G08G 1/0969
See application file for complete search history.

(56) References Cited

U.S. PATENT DOCUMENTS 6,192,314 B1 * 2/2001 Khavakh ............ G01C 21/3492
701/410
6,442,475 B1 8/2002 Utsui et al.
(Continued)

FOREIGN PATENT DOCUMENTS

JP 2002-82847 A 3/2002
JP 2002-318702 A 10/2002
(Continued)

OTHER PUBLICATIONS

Japanese Office Action for Japanese Application No. 2020-023603, dated Jan. 15, 2021, with English translation.
(Continued)

*Primary Examiner* — Gertrude Arthur Jeanglaude
(74) *Attorney, Agent, or Firm* — Birch, Stewart, Kolasch & Birch, LLP (57) ABSTRACT

A navigation system and a computer program are capable of changing the role of an apparatus that implements navigation in accordance with its performance and circumstances, and achieving single navigation, in a coordinated fashion, with multiple apparatuses to which their roles are appropriately distributed. At least one apparatus is provided with: a plurality of function executing units that independently have
(Continued)

different functions for navigation, each of the function executing units performing processing associated with the function in response to a given instruction and returning a result of the processing; and an instruction unit that provides an instruction to each of the plurality of function executing units, and receives a result of the processing returned in response to the instruction; the instruction unit of the apparatus provides an instruction to one or more of the plurality of function executing units according to a procedure suitable for a purpose to be accomplished as to navigation, and outputs navigation data based on a result of processing returned in response to the instruction.

7 Claims, 8 Drawing Sheets

(51) Int. Cl.
*G08G 1/0969* (2006.01)
*G06F 8/60* (2018.01)

(56) References Cited

U.S. PATENT DOCUMENTS

| | | | |
|---|---|---|---|
| 6,748,316 B2* | 6/2004 | Takayama | G08G 1/096888 |
| | | | 701/428 |
| 8,364,397 B2 | 1/2013 | Hamilton, II et al. | |
| 10,852,149 B2* | 12/2020 | Makino | G08G 1/0969 |
| 2010/0100559 A1 | 4/2010 | Washio | |

FOREIGN PATENT DOCUMENTS

| | | |
|---|---|---|
| JP | 2006-23887 A | 1/2006 |
| JP | 2007-226793 A | 9/2007 |
| JP | 2010-97431 A | 4/2010 |
| JP | 2010-197311 A | 9/2010 |

OTHER PUBLICATIONS

International Search Report for PCT/JP2017/029274 (PCT/ISA/210) dated Oct. 24, 2017.

* cited by examiner

NAVIGATION DATA PROCESSING SYSTEM, APPARATUS AND COMPUTER READABLE MEDIUM

CROSS-REFERENCE TO RELATED APPLICATIONS

This application is a Continuation application of U.S. application Ser. No. 16/323,500, which is the National Phase of PCT International Application No. PCT/JP2017/029274, filed on Aug. 14, 2017, which claims priority under 35 U.S.C. 119(a) to Patent Application No. 2016-161480, filed in Japan on Aug. 19, 2016, all of which are hereby expressly incorporated by reference into the present application.

FIELD

The present invention relates to a navigation data processing system that presents a route to a destination and information on the route, an apparatus belonging to the navigation data processing system and to a computer readable medium storing a computer program.

BACKGROUND

The ownership rate of a hand-held communication device, which is a so-called smartphone, is very high, and the user can always carry a hand-held communication device and acquire information collected from another hand-held communication device or a server computer of a data center with the hand-held communication device at any place. The majority of the hand-held communication devices these days have a function of specifying the location of their own devices. The user can thus receive a navigation service for displaying the location of his or her own on a map as well as can use functions of calling, sending and receiving of messages and etc. with the hand-held communication device. The user can receive a navigation service during traveling by carrying the hand-held communication device into a vehicle even if the vehicle is not mounted with a navigation device.

Meanwhile, as the technology of an on-vehicle navigation device progresses, integration of various functions advances, such as fusion of a retrieval function of information on availability of surrounding facilities and a play-back function of music in addition to a route search function on a map and a guidance function along a route.

Irrespective whether they are for the hand-held communication device or the on-vehicle navigation device, these navigation services are each implemented based on a computer program, while the size of the computer program tends to increase by the addition of various functions. Here, even in the case of adding or modifying one of the functions, all the functions are required to be updated since they are interdependent. In contrast thereto, Japanese Patent Application Laid-Open Publication No. 2002-318702 relates to a computer program in an on-vehicle navigation device, and proposes a program configuration in which a module associated with an additional function is provided separately from a module associated with a basic function, and the modules mutually have interfaces built-in for exchange of data to thereby facilitate addition of a function and enable reduction of the man-hours required for development.

SUMMARY

The hand-held communication device and the on-vehicle navigation device have advanced their developments while being directed to different services. As described above, however, both of the devices are carried or mounted on a mobile unit, and can specify their own locations and draw maps and the locations of their own on the maps by using map information. In addition, both of the devices have the communication functions to allow for cooperation with an external service and application to various services. That is, the hand-held communication device and the navigation device have differences in a hardware configuration and performance while having increasing overlapped functions.

In most cases, the user uses the navigation service implemented by the hand-held communication device in one situation and the on-vehicle navigation device in another situation at his or her own discretion. However, it is highly expected that the cooperation between the hand-held communication device and the on-vehicle navigation device would improve the convenience of the user.

For the cooperation between the hand-held communication device and the on-vehicle navigation device, conceivable is a method of arranging a function module for the basic function on the on-vehicle navigation device and arranging an extended module on the hand-held communication device, and interfaces are incorporated in the respective devices to permit interaction with each other (refer to Japanese Patent Application Laid-Open Publication No. 2002-318702). This makes it possible to separately develop these devices, resulting in reduction in man-hours. In this case, however, the functions are fixedly given to the respective devices, such as the on-vehicle navigation device associated with the basic function and the hand-held communication device associated with the extended function, for example. This makes it difficult to respond to changes in circumstances such as the performance of the respective devices, changes of the communication environment and so on.

The present disclosure is made in view of these problems, and aims at provision of a navigation data processing system capable of changing the role of an apparatus that implements navigation in accordance with its performance and circumstances, and achieving single navigation, in a coordinated fashion, with multiple apparatuses to which their roles are appropriately distributed, an apparatus belonging to the navigation data processing system and a computer readable medium storing a computer program.

A navigation data processing system according to a first aspect of the present disclosure, includes: at least one apparatus including a processor, the processor configured to: execute function processes for different functions concerning navigation, each of the function processes including performing processing corresponding to the function in response to a given instruction and returning a result of the processing; execute a single instruction process including providing an instruction to each of the function processes and receiving a result of processing returned in response to the instruction; provide instructions to one or more of the function processes according to a procedure suitable for a purpose to be accomplished as to navigation in executing the instruction process; and output navigation data based on results of processing returned in response to the instructions.

In a navigation data processing system according to a second aspect of the present disclosure, the processor executing the instruction process previously selects one or more of the function processes to be used out of the function processes for the purpose to be accomplished.

In a navigation data processing system according to a third aspect of the present disclosure, two or more of the apparatuses are included, each processor of at least any two of the apparatuses executes at least one of the function processes corresponding to an equal function, and the processor of one of the two apparatuses makes the function process of the equal function for use whereas the processor of the other one of the two apparatuses makes the function process unselected and unused in the instruction process.

In a navigation data processing system according to a forth aspect of the present disclosure, the processor of each of the apparatuses, in the instruction process, provides an instruction to a selected one of the function processes of its own apparatus or provides an instruction to a selected one of the function processes of another apparatus via a communication medium.

In a navigation data processing system according to a fifth aspect of the present disclosure, the processor of the apparatus executes selection from the plurality of function processes at any timing during operation.

In a navigation data processing system according to a sixth aspect of the present disclosure, the processor executing the function processes and the instruction process input and output the instruction and the result of processing by a command or a message.

A non-transitory computer readable medium storing a computer program according to one embodiment of the present disclosure, causes the computer to: execute function processes divided for different functions concerning navigation, each of the function processes including steps of performing processing corresponding to the function in response to a given instruction and returning a result of the processing; and execute a single instruction process including steps of providing an instruction to each of the function processes and receiving a result of a processing returned in response to the instruction, the instruction process including the steps: providing instructions to one or more of the function processes according to a procedure suitable for a purpose to be accomplished as to navigation; and outputting navigation data based on results of processing returned in response to the instructions.

In one embodiment of the present disclosure, configuration is made by at least one apparatus including a processor executing function processes each performing a different function based on an instruction provided by a single instruction process. Each of the function processes outputs a result of the processing in response to an instruction provided only from the instruction process capable of providing an instruction to each of the function processes. The processor executing the instruction process receives the result and outputs information on navigation based on the result. That is, the function processes each perform processing according to the instruction only from the instruction process and do not have mutual dependence among them, such as requesting another function process to perform processing. The processor executing the instruction process causes the function processes for different functions to perform processing by coordinating them with one another to thereby accomplish one purpose.

In one embodiment of the present disclosure, the function process to be used is selected depending on each purpose, and the role is dynamically changed among the apparatuses.

In one embodiment of the present disclosure, in the case of a configuration by the plurality of apparatuses, any two of the apparatuses may have function executing units corresponding to the same function. In this case, the function process of one of the apparatuses is used whereas the function process of the other one of the apparatuses performing the same function is not used.

In one embodiment of the present disclosure, in the case where the overlapped function processes are operable among the plurality of apparatuses, if one of the function processes is selected, the function process can also be used via the apparatus other than the apparatus in the selected function process. At this time, an instruction is provided via a communication medium, and the result is returned via the communication medium.

In one embodiment of the present disclosure, in each apparatus, a function process to be selected is not fixed. That is, every time a purpose to be accomplished occurs, a different function process is selected at any timing for use.

In one embodiment of the present disclosure, exchange of data between the function process and the instruction process is implemented by commands, messages or the like. Since the exchange of data is not performed by calling functions (API, etc.), independence between the function processes and the instruction process is enhanced, which equalizes the exchange of data between the function processes and the instruction process that are in different apparatuses with the exchange of data between the function processes and the instruction process that are in the same apparatus.

According to the embodiment of the present disclosure, the function processes do not have mutual dependence developed among them, which allows for interchange of the function modules corresponding to the function processes, a version upgrade and so on without affecting the entire system, and reduction of the man-hours required for development of the system. Each of the apparatuses can perform processing selectively using a necessary function process. The function processes and the instruction process are similarly made operable between different types of apparatuses, so that the use of the function processes in different combinations for each of the different apparatuses enables changes of the role of the apparatus and eliminates the need for previously fixing functions for each apparatus. That is, the role of the apparatus is not fixed to one and can be changed in real time in accordance with its performance and circumstances. The apparatuses each play a role in correspondence with its performance and circumstances and accomplish in a coordinated fashion one purpose concerning navigation, such as a route search, information retrieval and so on.

The above and further objects and features will more fully be apparent from the following detailed description with accompanying drawings.

MODES FOR CARRYING OUT THE INVENTION

The present invention will be described in detail below with reference to the drawings illustrating the embodiments thereof. The embodiments disclosed below are to be construed as illustrative and not restrictive in all aspects.

It is to be noted that, as used herein and in the appended claims, the singular forms "a", "an", and "the" include plural referents unless the context clearly dictates otherwise.

Figure 1:
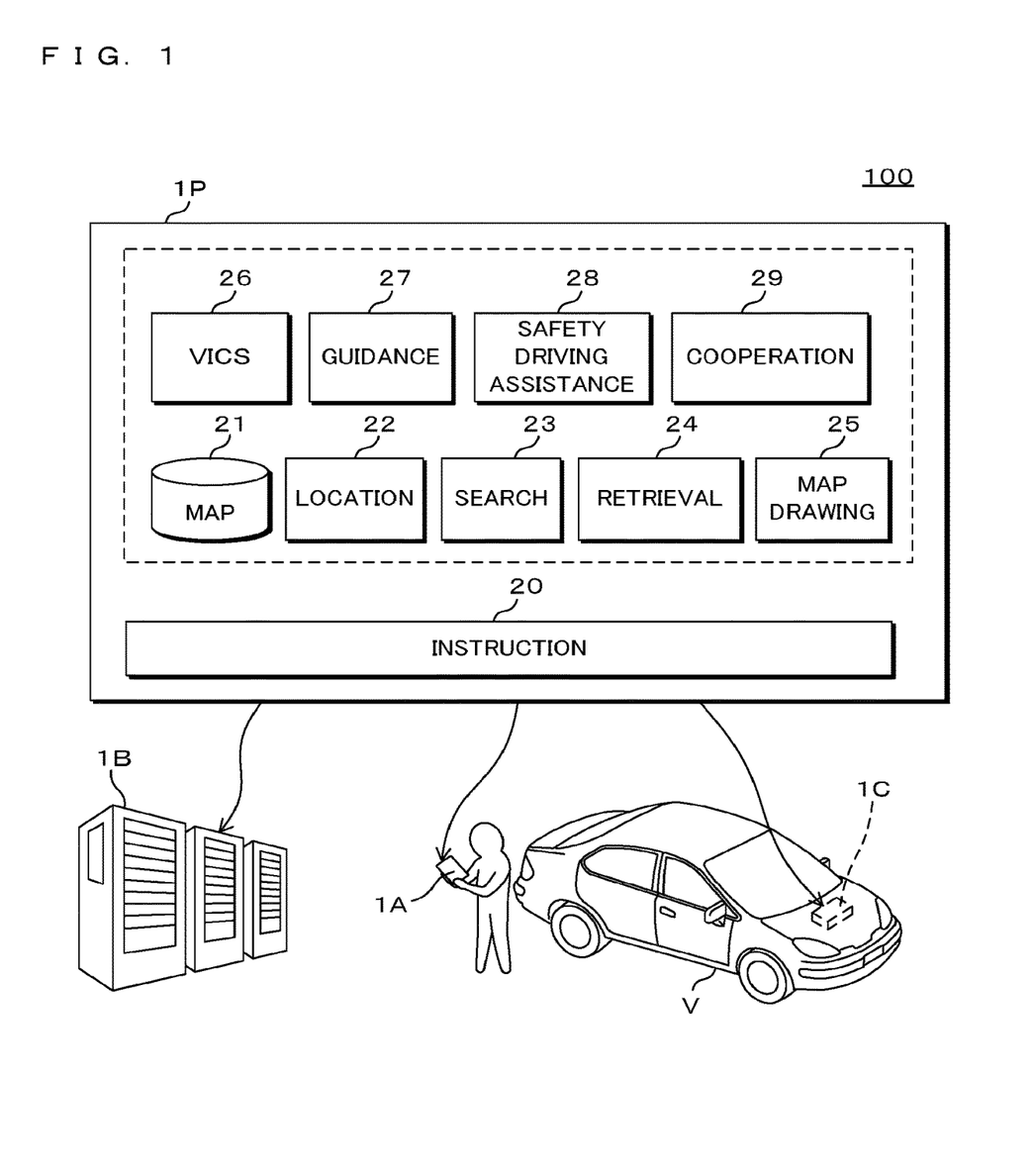
FIG. 1 is an explanatory view illustrating an outline of a navigation system according to the present embodiment.

FIG. 1 illustrates the outline of a navigation system 100 according to the present embodiment. The navigation system 100 includes at least an apparatus 1A and further includes apparatuses 1B and 1C that can communicate with the apparatus 1A as illustrated. In the example illustrated in FIG. 1, the apparatus 1A is a hand-held communication device, which is a so-called smartphone, the apparatus 1B is a server computer constituting a data center, and the apparatus 1C is a navigation device mounted on a vehicle V. The navigation system 100 is achieved by causing the apparatuses 1A, 1B and 1C to execute processing based on a common navigation program 1P.

The navigation program 1P is formed by a program module including function modules 21-29 independently operating to perform respective functions and an instruction module 20 instructing the function modules 21-29 to operate. Note that the term "module" is used for both of the meanings of a program component included in a navigation program 1P as well as an object activated by the computer (processor) executing each of the program components. The function modules 21-29 include a map information module 21, a location module 22, a search module 23, a retrieval module 24, a map drawing module 25, a vehicle information and communication system (VICS: registered trademark) module 26, a guidance module 27, a safety driving assistance module 28 and a cooperation module 29. The function modules 21-29 are configured to exchange data with only the instruction module 20. One of the function modules 21-29 does not directly depend on the other function modules 21-29. The exchange of data between the function modules 21-29 and the instruction module 20 is performed not by a method of mutually calling functions corresponding to the respective one of the modules but by a method of providing an instruction by a command, a message, or the like and receiving a reply in response thereto.

The program configuration of the navigation program 1P including the function modules 21-29 with high independence first allows for interchange of the function modules 21-29, a version upgrade without affecting the entire system, and reduction of the man-hours required for development of the system. Secondly, the apparatus 1A executing the navigation program 1P can execute processing by selectively using a necessary function out of the functions of the function modules 21-29 during operation by the instruction module 20. The apparatus 1A is not required to have fixed functions within the system and can selectively use the function modules 21-29 so as to suit its own performance and circumstances. Moreover, the navigation program 1P is made to be executed in a similar manner in the different types of apparatuses 1A, 1B and 1C, which eliminates the need for individually creating programs for different apparatuses. For example, a distinction between a server program and a client program is not required.

Accordingly, since the multiple apparatuses 1A, 1B and 1C can execute processing based on the same navigation program 1P, they do not have fixed functions and can selectively use functions so as to suit their performance and circumstances. In the situation where the instruction modules 20 of the respective apparatuses 1A, 1B and 1C can send and receive commands and messages or the like by communication, the apparatuses 1A, 1B and 1C can perform processing by selectively using the function modules 21-29 so as to suit their performance and circumstances and can mutually complement their functions. Here, if a communication connection is established among the apparatuses 1A, 1B and 1C, the physical place where the processing is to be executed based on each of the function modules 21-29 in response to the instruction is not limited irrespective of where an instruction comes from among the instruction modules 20 of the apparatuses 1A, 1B and 1C. Specifically, if the instruction module 20 of the apparatus 1A provides an instruction to the search module 23 for searching a route, the search module 23 of the apparatus 1B, not the apparatus 1A, may execute search, although detailed description of the functions of the respective function modules 21-29 will be made later.

In the navigation system 100 according to the present embodiment, the apparatus 1A can independently operate as the smallest unit as well as can dynamically disperse the functions to be executed to the apparatus 1B and the apparatus 1C to thereby achieve cooperative operation. The following describes the configuration and operation of the navigation system 100 in detail.

Figure 2:
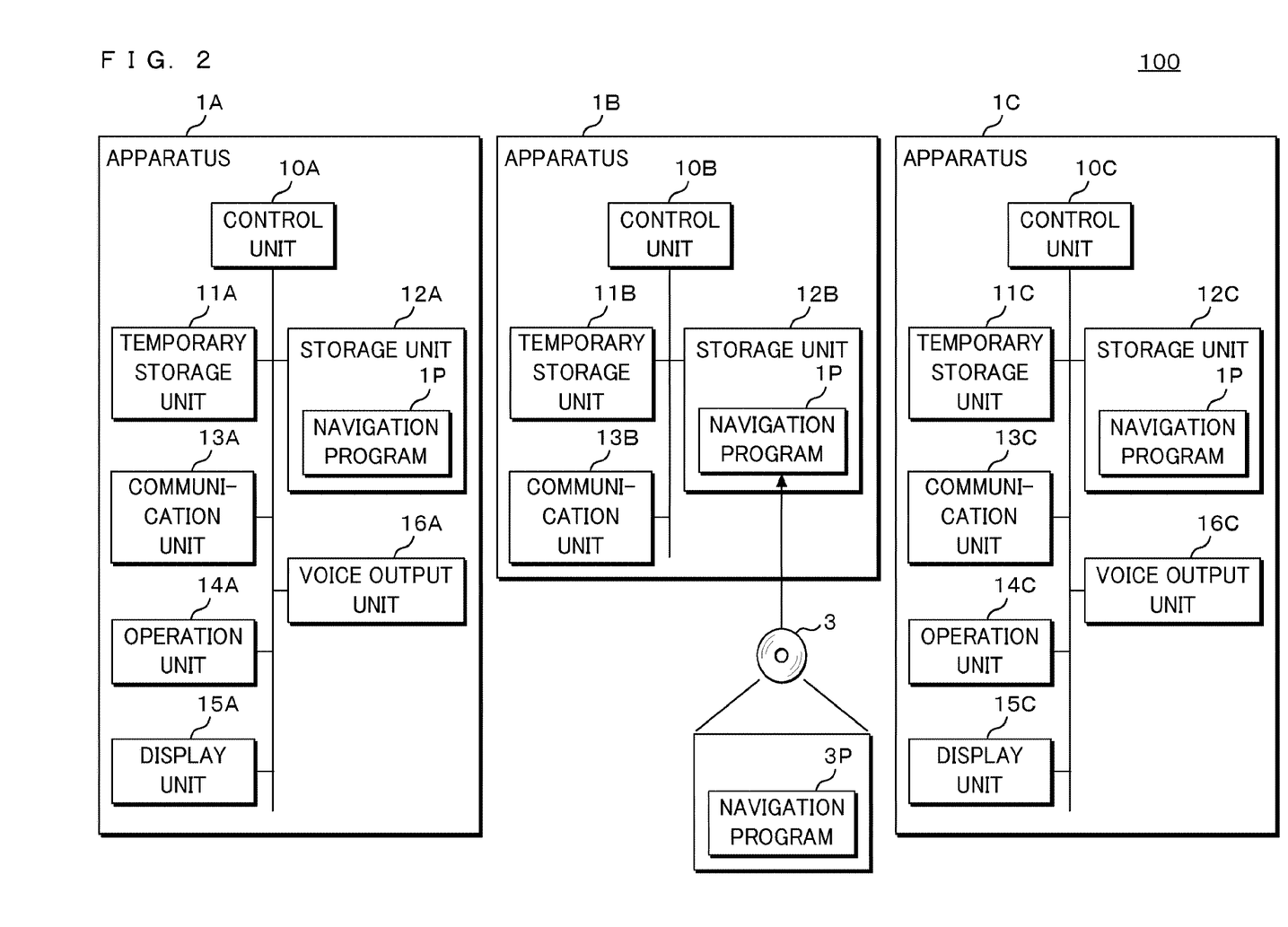
FIG. 2 is a block diagram illustrating the hardware configurations of apparatuses included in a navigation system according to a present embodiment.

FIG. 2 is a block diagram illustrating the hardware configurations of the apparatuses 1A, 1B and 1C included in the navigation system 100 according to the present embodiment. The apparatuses 1A, 1B and 1C included in the navigation system 100 according to the present embodiment each include at least a control unit 10, a temporary storage unit 11, a storage unit 12 and a communication unit 13 as illustrated in FIG. 2. The type and the detailed structure of the components may be different among the apparatuses 1A, 1B and 1C. In FIG. 2, common components out of the components are denoted by reference codes A, B and C for identifying their belonging.

The control unit 10 implements the operation based on the navigation program 1P stored in the storage unit 12. The types of the CPU may be different among the apparatuses. For example, multi-core CPUs with high concurrent processing power are used for the CPU of the control unit 10A of the apparatus 1A serving as a hand-held communication device and the CPU of the control unit 10B of the apparatus 1B serving as a server computer whereas a compact CPU incorporated in a microcomputer is used for the control unit 10C of the apparatus 1C serving as an on-vehicle device. It is necessary for either CPU to be hardware resources capable of executing processing based on the navigation program 1P.

The temporary storage unit 11 uses a volatile memory and temporarily stores information generated by the processing of the control unit 10. Note that the temporary storage unit 11 may be configured to be incorporated in the control unit 10.

The storage unit 12 is a storage using a nonvolatile memory and stores various data to which the control unit 10 refers and data on the result of the processing executed by the control unit 10 in addition to the navigation program 1P. The storage unit 12, for example, stores information indicative of the performance of the apparatuses 1A, 1B and 1C as well as version information of the function modules 21-29. The type of the storage unit 12 may also be different among the apparatuses 1A to 1C. For example, the storage units 12A and 12C of the respective apparatuses 1A and 1C use flash memories whereas the storage unit 12B of the apparatus 1B uses a hard disk. The navigation program 1P stored in the storage unit 12 may be recorded in a computer readable recording medium 3. The storage unit 12 stores a navigation program 3P read out from the recording medium 3 by a read-out device (not illustrated). The recording medium 3 may be an optical disk such as a compact disk (CD)-ROM, a digital versatile disc (DVD)-ROM, a Blu-ray (BD; registered trademark) disk or the like, a magnetic disk such as a flexible disk, a hard disk or the like, a magneto-optical disk, a semiconductor memory, and so on. The navigation program 3P may be downloaded from an external computer (not illustrated) connected to communication networks (not illustrated) and stored in the storage unit 12.

Any types of the communication unit 13 that allow for communication between the apparatuses may be used. For example, the communication unit 13A of the apparatus 1A serving as a hand-held communication device includes multiple communication modules corresponding to wireless communication with a base station, etc. provided by a communication common carrier, and a short range wireless communication, such as Wi-Fi, Bluetooth (registered trademark), etc. The communication unit 13B of the apparatus 1B serving as a server computer corresponds to an optical network. The communication unit 13C of the apparatus 1C serving as an on-vehicle device includes multiple communication modules corresponding to wireless communication with a base station, a short range wireless communication such as Wi-Fi, Bluetooth (registered trademark), etc. and a receiving unit for VICS, etc. Note that the communication unit 13 may be able to send and receive at least common protocol data based on TCP/IP or UDP/IP.

At least one of the apparatuses 1A, 1B and 1C may have an input interface to be operated by the user while at least one of them may similarly have an output interface for displaying a map image and a route concerning navigation and for outputting voice guidance. In the example in FIG. 2, the apparatus 1A serving as a hand-held communication device and the apparatus 1C serving as an on-vehicle navigation device each have an operation unit 14 (14A, 14C) as an input interface as well as a display unit 15 (15A, 15C) and a voice output unit 16 (16A, 16C) as output interfaces. The operation unit 14 accepts an operation input by detecting a tap or the like on an operation screen including an icon, etc. displayed on the display via a touch panel integrated in the display functioning as a display unit 15. The display unit 15 displays an operation screen concerning navigation, a drawn map, a route, a guidance screen and so on by using the above-mentioned touch panel built-in display. The voice output unit 16 outputs voice guidance concerning navigation by using a speaker.

Figure 3:
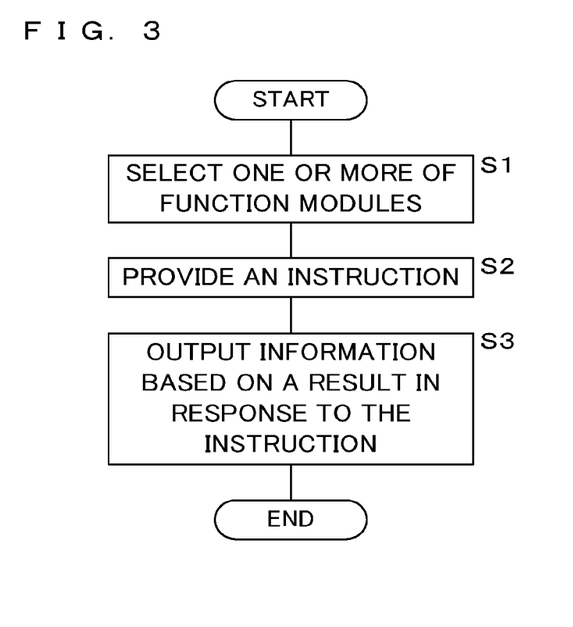
FIG. 3 is a flowchart illustrating one example of basic processing when a control unit functions as an instruction module.

FIG. 3 is a flowchart illustrating one example of basic processing when the control unit 10 functions as an instruction module 20. The control unit 10 selects one or more of the function modules 21-29 to be used in its own apparatus or another apparatus (step S1). The function modules 21-29 to be used are activated and wait for an instruction from the instruction module 20. Note that the control unit 10 successively selects function modules as appropriate in accordance with the changes during the operation based on the performance and usage of its own apparatus at step S1. The criteria for selection here may vary depending on the circumstances changing from moment to moment during operation of the apparatus 1 (various conditions including a position, an angle, another program that is being activated, the presence or absence of another apparatus) and the purpose such as what is to be done in the circumstances as the navigation program 1P (search, retrieval, guidance, or the like) as will be described in detailed examples below. It is noted that the purpose may preferably be a purpose to be accomplished by the cooperative multiple apparatuses 1A, 1B and 1C as a whole (functions in general regarding navigation such as attainment of a destination, provision of information on the actual location, etc.). Hence, the control unit 10 may mutually select function modules with reference to the presence or absence (activation) of another apparatus and the performance of another apparatus by communicating with the control unit 10 functioning as the instruction module 20 of another apparatus. If any of the function modules 21-29 is selected based on the performance, some of the functions may not be used due to the restriction on the hardware. The control unit 10 may previously remove these unusable functions from the selection items. The criteria for selection are not limited thereto.

The control unit 10 provides an instruction to the function modules 21-29 that are being selected and activated in accordance with the necessity at that time point (step S2). The object to which an instruction is provided may be the function modules 21-29 of any apparatuses including its own apparatus and another apparatus. The necessity at that time point means the necessity for processing required depending on the purpose to be accomplished by the cooperative multiple apparatuses 1A, 1B and 1C as a whole (or by the apparatus 1A, 1B or 1C independently) as described above.

The control unit 10 outputs information concerning navigation to others based on a result returned from the function modules 21-29 in response to the instruction (step S3). The "others" mentioned here may be the next procedure based on the navigation program 1P or may be the output interface of its own apparatus or another apparatus, for example. It may also be another application program in cooperative with the navigation program 1P or may be another apparatus outside the system.

The following description will be made on, taking detailed examples, the function modules 21-29 selectively functioning among the apparatuses 1A, 1B and 1C in accordance with the performance and circumstances in the navigation system 100 thus configured.

Figure 4:
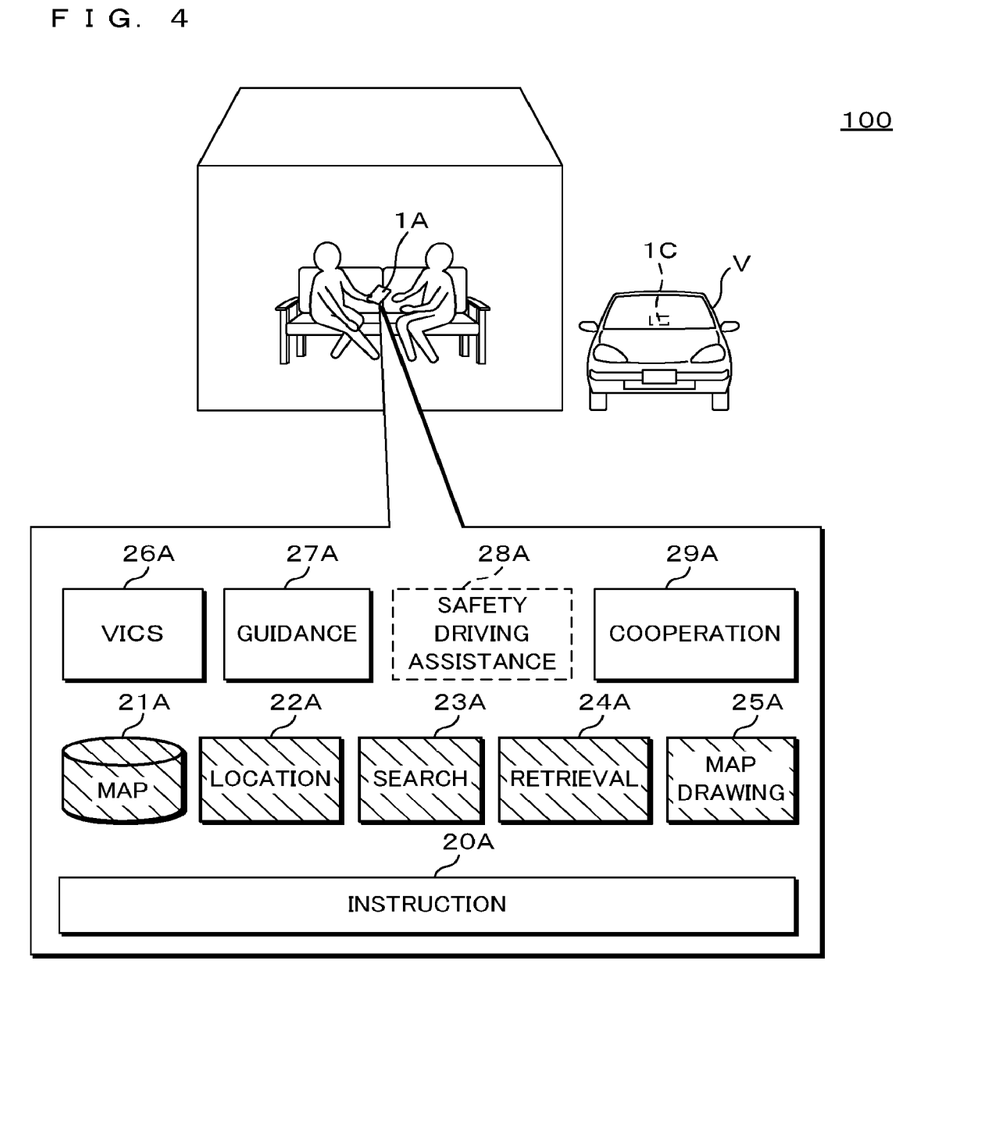
FIG. 4 is an explanatory view illustrating a basic configuration of a navigation system according to a present embodiment.

FIG. 4 illustrates a basic configuration of the navigation system 100 according to the present embodiment. The navigation system 100 can be operated by a single apparatus 1A as the smallest unit. The scene where the navigation system 100 illustrated in FIG. 4 is used is a situation where the user examines a destination and the route before getting into the vehicle V. The apparatus 1B is not included in the navigation system 100 until a communication connection is performed from the apparatus 1A, and the apparatus 1C serving as the navigation device of the vehicle V is not operated.

In the situation illustrated in FIG. 4, the control unit 10A of the apparatus 1A operates as the instruction module 20A based on the instruction module 20 included in the navigation program 1P. The control unit 10A of the apparatus 1A further operates as a map information module 21A, a location module 22A, a search module 23A, a retrieval module 24A, a map drawing module 25A, a VICS module 26A, a guidance module 27A, a safety driving assistance module 28A and a cooperation module 29A based on the respective function modules 21-29.

The map information module 21A stores and reads out map information. Since the storage capacity of the apparatus 1A is smaller than that of the apparatus 1B, for example, the map information module 21A stores a map around the destination retrieved most recently or a map frequently used.

The location module 22A acquires the present location (location of itself). The location module 22A of the apparatus 1A serving as a hand-held communication device acquires latitude-longitude information using a GPS receiver integrated in the apparatus 1A and further acquires a more detailed location through communication with a base station by utilizing the Wi-Fi via the communication unit 13A.

The search module 23A searches the route to a destination. It accepts a departure point and a destination, and outputs candidates for multiple routes with reference to the map information and the traffic information.

The retrieval module 24A executes information retrieval. It accepts a retrieval keyword such as an address, a name, a genre and so on to thereby output the result of destination retrieval processing, as well as accepts the information on a departure point, a present point or a route to thereby output information on the facilities located around them. The retrieval module 24A of the apparatus 1A basically requests an external search engine to perform retrieval processing via the communication unit 13A.

The map drawing module 25A accepts map information, a route and a present position to thereby perform drawing (display) processing of the map, and the present position and the route on the map, etc., and output image data obtained by the drawing.

The VICS module 26A periodically acquires VICS information from an optical beacon, a radio beacon or an FM radio wave, for example. In the case where the apparatus 1A is provided with a receiving antenna for an FM radio wave, the VICS module 26A can acquire VICS information from an FM radio wave. In the case where the apparatus 1A is not provided with a receiving antenna, the VICS module 26A is made unused.

The guidance module 27A instructs the user for the traveling direction, guides handling operation such as left turn, right turn, etc. and attracts attention to a railroad crossing or the like based on the present location and the route by using voice and images.

The safety driving assistance module 28A performs driving assistance such as alerting the driver based on an input signal from a sensor, a camera and so on, or notifying the control system of the vehicle, or the like of information. In the apparatus 1A serving as a hand-held communication device, the safety driving assistance module 28A is made unused as depicted by dotted lines.

The cooperation module 29A performs service other than the navigation system 100, for example, cooperation with a search engine. The cooperation module 29A connects with an external service server using the communication unit 13A and outputs information based on a retrieval keyword, for example.

The instruction module 20A provides a command to each of the function modules 21A-29A and receives the result of the processing in response to the command. For example, the instruction module 20A first causes the display unit 15A to display an operation screen and accepts operation performed on the operation screen by the operation unit 14A. The instruction module 20A provides any of the function modules 21A-29A with an instruction command corresponding to the operation in accordance with the accepted operation. The instruction module 20A then causes the display unit 15A to display an image based on the result of the processing output from the function modules 21A-29A and causes the voice output unit 16A to output voice.

The detailed situation illustrated in FIG. 4 is a situation where the user intends to set a destination by using the apparatus 1A at home before departing from home by the vehicle V. At this time, in the apparatus 1A, the instruction module 20A provides the information on the name of the destination, etc. accepted by the operation unit 14A to the retrieval module 24A and causes the display unit 15A to output the result of the retrieval processing output from the retrieval module 24A. The instruction module 20A provides the map information module 21A with the location information (latitude-longitude information) of the destination selected from the results of the retrieval processing and the location information of the present location (the location where the apparatus 1A exists) acquired from the location module 22A to thereby acquire information on a neighboring map. The instruction module 20A provides the search module 23A with the location information of the destination and the present position and the information on the neighboring map. The search module 23A outputs a search result, and the instruction module 20A causes the display unit 15A to display the output search result. If multiple candidates for the search result are output, selection is accepted by the operation unit 14A. In the example in FIG. 4, the function modules 21A, 22A, 23A, 24A and 25A used in practice are depicted by hatching.

Here, the instruction module 20A may temporarily hold the information on the selected route in the storage unit 12A. The instruction module 20A may then cause the display unit 15A to display the operation screen including icons for accepting an instruction for the start of guidance (leading) and the retrieval of information around the route, and may wait for operation.

Figure 5:
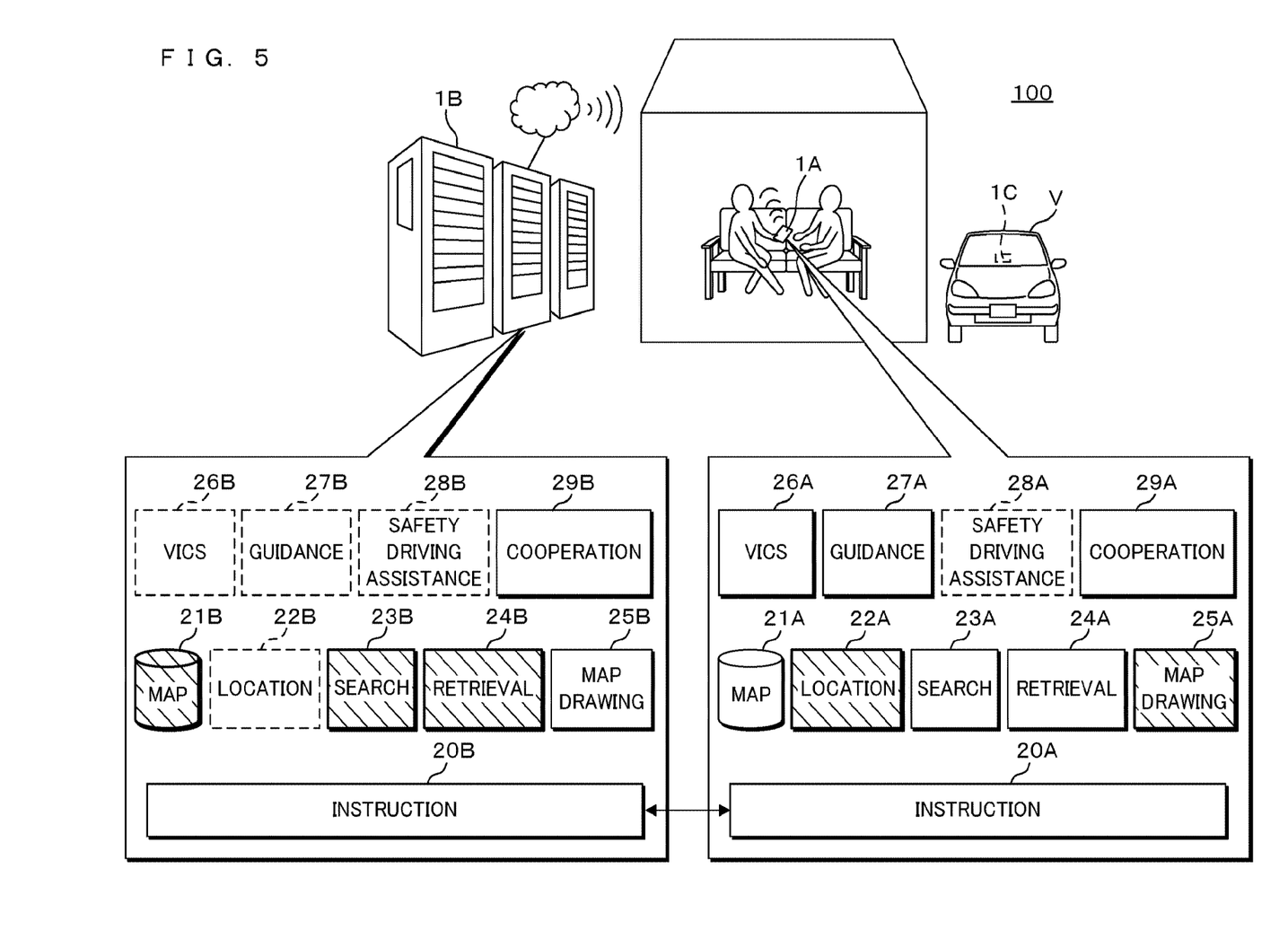
FIG. 5 is an explanatory view illustrating another configuration of a navigation system.

The advantage of the navigation system 100 according to the present embodiment is effectively produced when the navigation system 100 is formed by multiple apparatuses, although the navigation function can be performed as described above by the apparatus 1A alone. FIG. 5 illustrates another configuration of the navigation system 100. In the configuration illustrated in FIG. 5, the apparatus 1A is enabled to communicate with the apparatus 1B via the communication unit 13A, so that the apparatus 1B participates in the navigation system 100. The apparatus 1C serving as a navigation device of the vehicle V is not activated.

In the situation illustrated in FIG. 5, the control unit 10B of the apparatus 1B operates as an instruction module 20B and each of the function modules 21B-29B. The functions of the instruction module 20B and the function modules 21B-29B are basically similar to those of the respective modules in the apparatus 1A. In the case of the apparatus 1B, however, the storage capacity of the storage unit 12B is far much larger than those of the others, and the processing capability of the control unit 10B is also higher than those of the others. The apparatus 1B is not a mobile unit, and does not include an input interface and an output interface. The location module 22B, the VICS module 26B, the guidance module 27B and the safety driving assistance module 28B are also included in the navigation program 1P of the apparatus 1B. However, these modules are all unused as depicted by dotted lines since the apparatus 1B is not a mobile unit and does not include a hardware for receiving VICS information or the like.

As illustrated in FIG. 5, in the case where the instruction module 20B and the instruction module 20A are enabled to exchange commands and messages or the like by establishment of a communication connection between them, the instruction module 20A of the apparatus 1A and the instruction module 20B mutually exchange information concerning their own performance. The instruction modules 20A and 20B determine that the map information module 21B is to be used in priority to the map information module 21A since the map information module 21B has more detailed map information than the map information module 21A as to the map information function, for example. The instruction modules 20A and 20B exchange the result of the determination with each other and have a common awareness of use of the map information module 21B of the apparatus 1B as to the map information. Likewise, the instruction modules 20A and 20B have a common awareness of use of the search module 23B and the retrieval module 24B of the apparatus 1B since the apparatus 1B has high processing capability and high volume of obtainable information as to the search function and the retrieval function.

The detailed situation in the example illustrated in FIG. 5 is a situation where the user intends to set a destination at home by using the apparatus 1A before departing by the vehicle V, as in FIG. 4. In the situation illustrated in FIG. 5, the apparatus 1A is enabled to communicate with the apparatus 1B, so that the function modules 21, 22, 23, 24 and 25 that are actually to be used are dispersed to the apparatuses 1A and 1B as depicted by hatching.

Which apparatus including function modules 21-29 is to be used may be determined in accordance with the circumstances as well as the performance. The instruction module 20A may, for example, select an appropriate map information module 21 based on the information on the destination and route that are temporarily held in the storage unit 12A in the situation depicted in FIG. 4. For example, the instruction module 20A compares the region corresponding the map information to which the map information module 21A of the apparatus 1A can refer and the region corresponding to the map information to which the map information module 21B of the apparatus 1B can refer, and uses the map information module 21 suitable for a selected route (destination). If the destination is within a region used very frequently or a region used most recently, the map information module 21A is used. If, on the other hand, the destination is within a region where the user visits for the first time, the map information module 21B of the apparatus 1B of the data center with high volume of information is used. In this case, when accepting by the operation unit 14A selection of an icon corresponding to the retrieval on the operation screen displayed on the display unit 15A, the instruction module 20A provides a command or message instructing for retrieval including a keyword upon retrieval to the retrieval module 24B, not to the retrieval module 24A, via the instruction module 20B. As described above, the apparatuses 1A and 1B can respectively execute the retrieval modules 24A and 24B that perform the same function and similarly return the execution result. For the instruction module 20A, the result obtained by executing the retrieval may be returned to any one of the apparatuses 1A and 1B. The instruction module 20A receives the retrieval result output from the retrieval module 24B by the communication unit 13A and displays it on the display unit 15.

Hence, in the navigation system 100, if the multiple apparatuses 1A and 1B are enabled to communicate with each other, the functions to be used are dispersed according to the usage or the performance of the apparatuses 1A and 1B, which achieves navigation in a cooperative manner.

Figure 6:
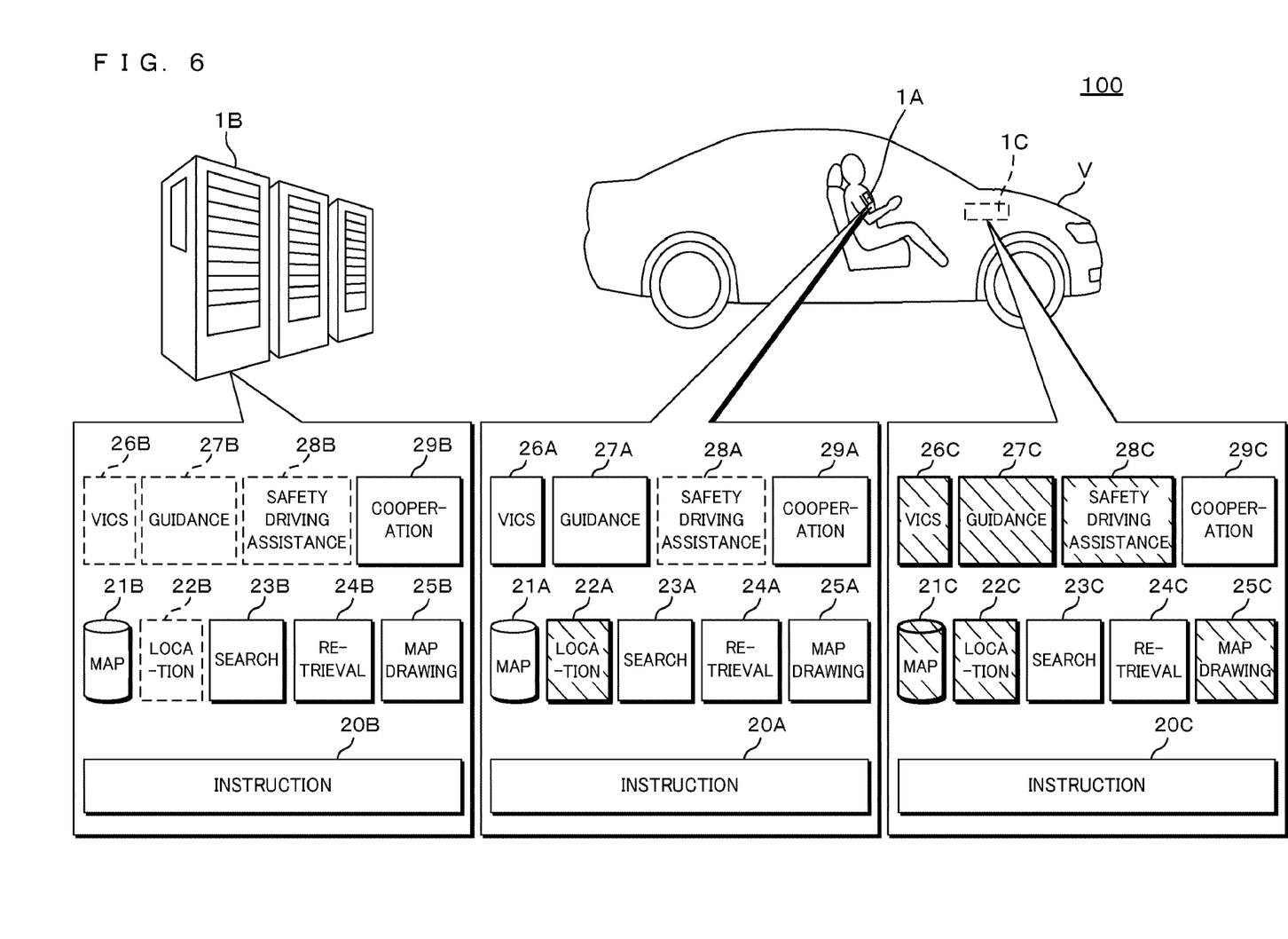
FIG. 6 is an explanatory view illustrating another configuration of a navigation system.

If the user starts the vehicle V based on the retrieved route, the apparatus 1C participates in the navigation system 100. FIG. 6 is an explanatory view illustrating another configuration of the navigation system 100. In the scene where the navigation system 100 illustrated in FIG. 6 is used, the apparatus 1C serving as the navigation device of the vehicle V is activated and enabled to communicate with the apparatus 1A and the apparatus 1B or any one of them by the communication unit 13C.

The control unit 10C of the apparatus 1C in the situation illustrated in FIG. 6 operates as an instruction module 20C and each of the function modules 21C-29C. The functions of the instruction module 20C and the function modules 21C-29C are basically similar to those of the respective modules in the apparatuses 1A and 1B. In the case of the apparatus 1C, the function modules 21C-29C including the safety driving assistance module 28C are basically made usable since the apparatus 1C is an on-board device mounted on the vehicle V.

When the engine or the motor starts to cause the vehicle C to travel as illustrated in FIG. 6 and to activate the apparatus 1C, the instruction module 20C starts to operate and is enabled to exchange commands, messages or the like with the instruction modules 20A and 20B of the respective apparatuses 1A and 1B. The instruction modules 20A, 20B and 20C mutually exchange information on performance of their own apparatuses.

The apparatuses 1A and 1C each have the operation unit 14, the display unit 15 and the voice output unit 16. The instruction modules 20A and 20C determine which operation unit 14, display unit 15 and voice output unit 16 are to be used. Assume here that the user can select the input-output interface of which one of the apparatuses 1A and 1C is to be used on the operation screen displayed on the display unit 15A of the apparatus 1A. This allows the instruction modules 20A and 20C to have a common awareness as to which one of the apparatuses 1A and 1C is to be used for its input-output interface. Note that the operation unit 14 of the apparatus 1A and the display unit 15C of the apparatus 1C may be selected for use or vice versa.

If it is determined that the apparatus 1A is not used as an input-output interface, the instruction modules 20A and 20C have a common awareness of use of the operation unit 14C, the display unit 15C and the voice output unit 16C as an input-output interface. The instruction modules 20A and 20C have a common awareness of use of the location module 22C and the guidance module 27C of the apparatus 1C as to the location function and guidance function so as to suit the situation where the input-output interface of the apparatus 1C is used, for example. Furthermore, the instruction modules 20A, 20B and 20C have a common awareness of use of the VICS module 26C of the apparatus 1C provided with an antenna for receiving a beacon radio wave as to the VICS function, and make the VICS module 26A that has been used up to then unused. Hence, the instruction modules 20A, 20B and 20C dynamically determine which apparatus including the function modules 21-29 is to be used in accordance with user's selection, the performance of the respective apparatuses, the circumstances and the function to be implemented, and they cooperatively achieve presentation and guidance of the route during traveling.

As to another function, for example, the map information module 21 as described above, a module of any of the apparatuses 1A, 1B and 1C from which appropriate information can be acquired may be used. As to the map drawing module 25, the cooperation module 29 and so on, the instruction modules 20A, 20B and 20C may make a determination among them as required such that the modules of any of the apparatuses 1A, 1B and 1C having allowance for a processing load or a communication load are to be used.

In the situation as illustrated in FIG. 6, the instruction module 20C starts to operate, and the instruction modules 20A and 20C have a common awareness of use of the location module 22C and the guidance module 27C of the apparatus 1C as described above. Accordingly, the instruction module 20A sends the set (selected) information on the destination and the route held by the storage unit 12A to the instruction module 20C. This eliminates the need for setting again the destination and the route that were once set in the apparatus 1A in the navigation device of the apparatus 1C. Note that the instruction module 20A may automatically send the information on the destination and the route to the apparatus 1C when detecting a communication connection with the apparatus 1C to thereby share the information.

In the case where the multiple apparatuses 1A, 1B and 1C are thus enabled to communicate with one another in the navigation system 100, the functions to be used are dispersed in accordance with the performance (hardware) of the apparatuses 1A, 1B and 1C, the load or the user's selection, so that the purpose of navigation is cooperatively accomplished.

Figure 7:
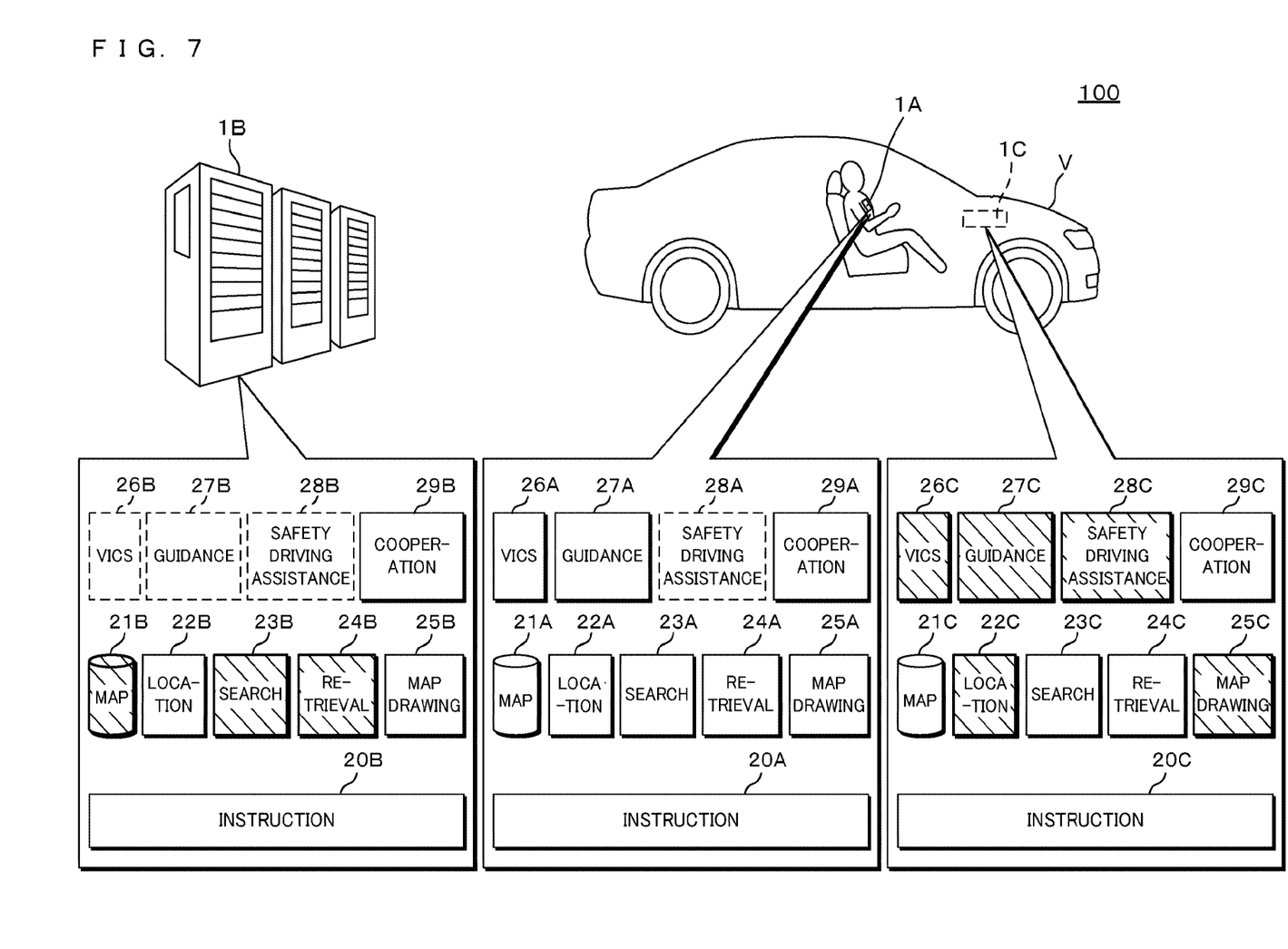
FIG. 7 is an explanatory view illustrating operation of a navigation system in another situation.

Even in the case where the navigation system 100 is formed by the apparatuses 1A, 1B and 1C similarly to the configuration illustrated in FIG. 6, the function modules 21-29 to be used among the apparatuses 1A, 1B and 1C vary in real time in accordance with the purpose of navigation other than the performance fixed to each of the apparatuses 1A, 1B and 1C. FIG. 7 illustrates operation of the navigation system 100 in another situation. The detailed situation in the example illustrated in FIG. 7 is a situation where the user being a driver or a passenger performs operation of instructing retrieval of information on the neighborhood of the destination or search for another route by the operation unit 14C (or the microphone).

The instruction module 20C of the apparatus 1C, having received operation, determines whether a search module 23C of itself or the other instruction modules 20A and 20B are to be used in view of the communication environment (good or bad connection state), the load of the control unit 10 and so on at that time. The instruction module 20C selects an apparatus including the search module 23 to be used in view of the result of the determination by the other instruction modules 20A and 20B, and the instruction modules 20A-20C have a common awareness of the determination result. In the situation illustrated in FIG. 7, the search module 23B of the apparatus 1B is selected based on the fact that the present location is close to the destination, and the search module 23B has the map information around the destination that is the easiest to be referred by the apparatus 1B and has a large volume of information about it, and has a low processing load. Here, the management module 20C determines that establishing a direct communication connection with the apparatus 1B is unstable, and communicates with the apparatus 1B via the instruction module 20A of the apparatus 1A. That is, a search instructing command is provided from the instruction module 20C to the instruction module 20B via the instruction module 20A.

Hence, as illustrated in FIG. 7, the search module 23B and the map information module 21B of the apparatus B that are being used are displayed by hatching and the search modules 23A and 23C are not used, as compared with the function modules 21-29 illustrated in FIG. 6. In the navigation system 100 according to the present embodiment, the roles of the apparatuses 1A, 1B and 1C can dynamically be changed according to the user's operation, that is, the purpose generated by the operation.

Note that when accepting an instruction for route search by the operation unit 14C of the apparatus 1C, the management modules 20A, 20B and 20C may refer to the search histories stored in the apparatus 1A, the apparatus 1B or moreover a fourth apparatus not illustrated (personal computer at home). Note that by the cooperation module 29C or 29A, the histories of the searched route are stored in association with the identification information of the users in an external cloud server so that the user can refer to the cloud server for the histories of the route.

Figure 8:
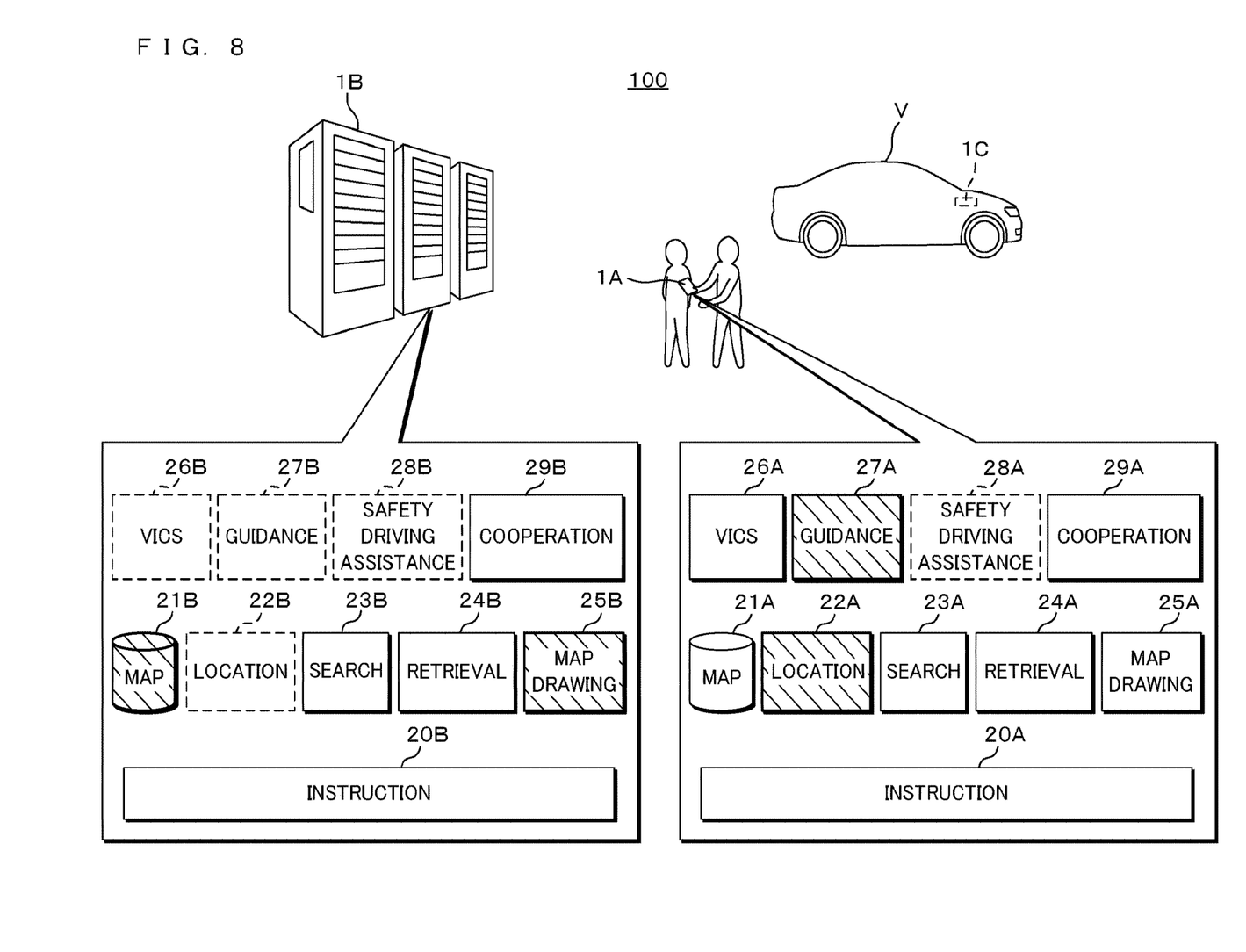
FIG. 8 is an explanatory view illustrating operation of a navigation system in another situation.

FIG. 8 illustrates the operation of the navigation system 100 in another situation. The situation illustrated in FIG. 8 is a situation where the user parks the vehicle V at a parking lot and walks to the destination by using the apparatus 1A. In the situation illustrated in FIG. 8, the apparatus 1C stops its operation and is not included in the navigation system 100 since the vehicle V is parked as illustrated. Thus, the input-output interface to be used is changed from the apparatus 1C to the apparatus 1A. By the instruction module 20C of the apparatus 1C notifying the instruction module 20A of the shift to the stopped state, the instruction module 20A can determine that the input-output interface of its own apparatus is to be used. At this time, the guidance module 27A of the apparatus 1A is selected for use according to the purpose of guiding the route as illustrated in FIG. 8. The map information module 21B of the apparatus 1B with high volume of information because of including a map around the destination and the map drawing module 25B based thereon are selected for use.

Hence, the navigation system 100 can dynamically change the roles of the apparatuses 1A, 1B and 1C in accordance with not only the operation performed by the user but also various circumstances, such as the situations of the apparatuses 1A, 1B and 1C constituting the system 100, the positional relation between the route being guided and the present position, changes of communication environment, traffic information received by the VICS module 26C, and so on. In addition, even if the function modules 21-29 to be used are changed among the apparatuses 1A, 1B and 1C in accordance with the change of the circumstances, the user does not recognize it. Furthermore, the user can seamlessly use the apparatus 1A and the apparatus 1C each of which have an input-output interface in order to achieve one purpose such as guidance to a destination, which significantly improves the convenience of the user.

Any apparatus other than the apparatuses 1A, 1B and 1C may participate in the navigation system 100 if only the apparatus can execute the navigation program 1P according to the present embodiment. In the example illustrated in FIGS. 4-8, only the apparatuses 1A and 1C concerning the same user or the vehicle V and the apparatus 1B serving as a server computer of the data center are configured to cooperate with one another. However, the navigation device of another vehicle driving on the opposite lane to the vehicle V or another vehicle driving in the same direction may also be included in the navigation system 100 so as to cooperate with the vehicle V. By using the route information held by the instruction module 20 operating in the navigation device of another vehicle (congestion predication based on a large number of vehicles traveling in the same direction), traffic information (congestion state of the destination) and so on, more efficient route search and the like may be implemented.

Moreover, the navigation device of another vehicle or another hand-held communication device existing in the vicinity of the destination may also be included for cooperation. This makes it possible to predict the congestion state of a parking lot at the destination or the surrounding parking lots based on the information obtainable from the instruction module 20 of the apparatus existing in the destination, for example. Hence, it is possible to enhance the level of satisfaction with the navigation service by achieving more appropriate route search and guidance, and retrieval with high simultaneousness and high accuracy.

Various type of apparatuses including an immovable apparatus such as a personal computer installed in a shop, for example, not limited to the navigation device and the hand-held communication device, may execute the processing based on the navigation program 1P according to the present embodiment to form the navigation system 100. Exchanges of data among the instruction modules 20 of the various type of apparatuses enable improvement in the navigation service, such as automatic selection of a suitable route based on traffic information, setting of fuel efficiency, and so on.

It should be understood that the embodiments disclosed above are illustrative and non-restrictive in every respect. Since the scope of the present invention is defined by the appended claims rather than by the description preceding them, all changes that fall within metes and bounds of the claims, or equivalence of such metes and bounds thereof are therefore intended to be embraced by the claims.

What is claimed is:

1. A navigation data processing system, comprising at least one apparatus including a processor, the processor configured to:
   select one or more of a plurality of function processes to be executed in response to a purpose to be accomplished as to navigation, wherein the plurality of function processes are executable by the processor for different functions concerning navigation, each of the function processes including performing processing corresponding to a respective function and returning a result of the processing;
   execute an instruction process by providing an instruction to each of the selected one or more function processes according to a procedure suitable for the purpose to be accomplished as to navigation and receiving a result of processing returned in response to each of said instruction provided to a corresponding one of the selected one or more function processes; and
   output navigation data based on results of processing returned in response to the execution of the instruction process.

2. The navigation data processing system according to claim 1, wherein two or more of the apparatuses are included,
   wherein each processor of at least any two of the apparatuses executes at least one of the function processes corresponding to an equal function, and
   wherein the processor of one of the two apparatuses makes the function process of the equal function selected for use in the instruction process whereas the processor of the other one of the two apparatuses makes the function process of the equal function unselected and unused in the instruction process.

3. The navigation data processing system according to claim 2, wherein the processor of each of the apparatuses, in the instruction process, provides an instruction to a selected one of the plurality of function processes of its own apparatus or provides an instruction to a selected one of the plurality of function processes of another apparatus via a communication medium.

4. The navigation data processing system according to claim 1, wherein the processor of the apparatus executes selection from the plurality of function processes at any timing during operation.

5. The navigation data processing system according to claim 1, wherein the processor executing the plurality of function processes and the instruction process input and output the instruction and the result of processing by a command or a message.

6. An apparatus belonging to a navigation data processing system, the apparatus comprising:
   a non-volatile memory configured to store a navigation program; and
   a processor performing processing based on the navigation program,
   wherein the processor configured to:
   select one or more of a plurality of function processes to be executed in response to a purpose to be accomplished as to navigation, wherein the plurality of function processes are executable by the processor for different functions concerning navigation, each of the function processes including performing processing corresponding to a respective function and returning a result of the processing;
   execute an instruction process by providing an instruction to each of the selected one or more function processes according to a procedure suitable for the purpose to be accomplished as to navigation and receiving a result of processing returned in response to each of said instruction provided to a corresponding one of the selected one or more function processes; and
   output navigation data based on results of processing returned in response to the execution of the instruction process.

7. A non-transitory computer readable medium storing a computer program causing a computer to execute navigation data processing, wherein the computer program causes the computer to:
   select one or more of a plurality of function processes to be executed in response to a purpose to be accomplished as to navigation, wherein the plurality of function processes are executable by the processor for different functions concerning navigation, each of the function processes including steps of performing processing corresponding to a respective function and returning a result of the processing; and
   execute an instruction process by providing an instruction to each of the selected one or more function processes according to a procedure suitable for the purpose to be accomplished as to navigation and receiving a result of processing returned in response to each of said instruction provided to a corresponding one of the selected one or more function processes; and
   outputting navigation data based on results of processing returned in response to the execution of the instruction process.

* * * * *